Dec. 30, 1930.  J. B. VERHOFF  1,787,026
AGRICULTURAL IMPLEMENT
Filed Sept. 8, 1928  4 Sheets-Sheet 1
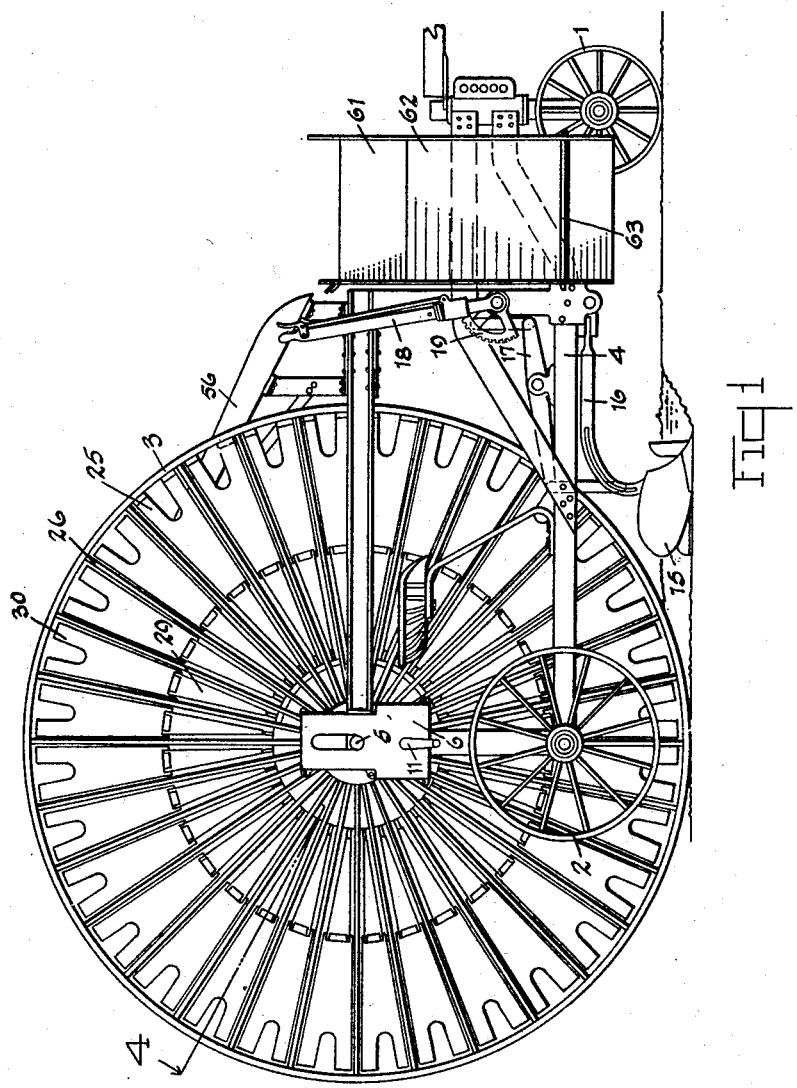
Inventor
John Bernard Verhoff
By Faust F. Crampton
Attorney Dec. 30, 1930.    J. B. VERHOFF    1,787,026
AGRICULTURAL IMPLEMENT
Filed Sept. 8, 1928    4 Sheets-Sheet 2
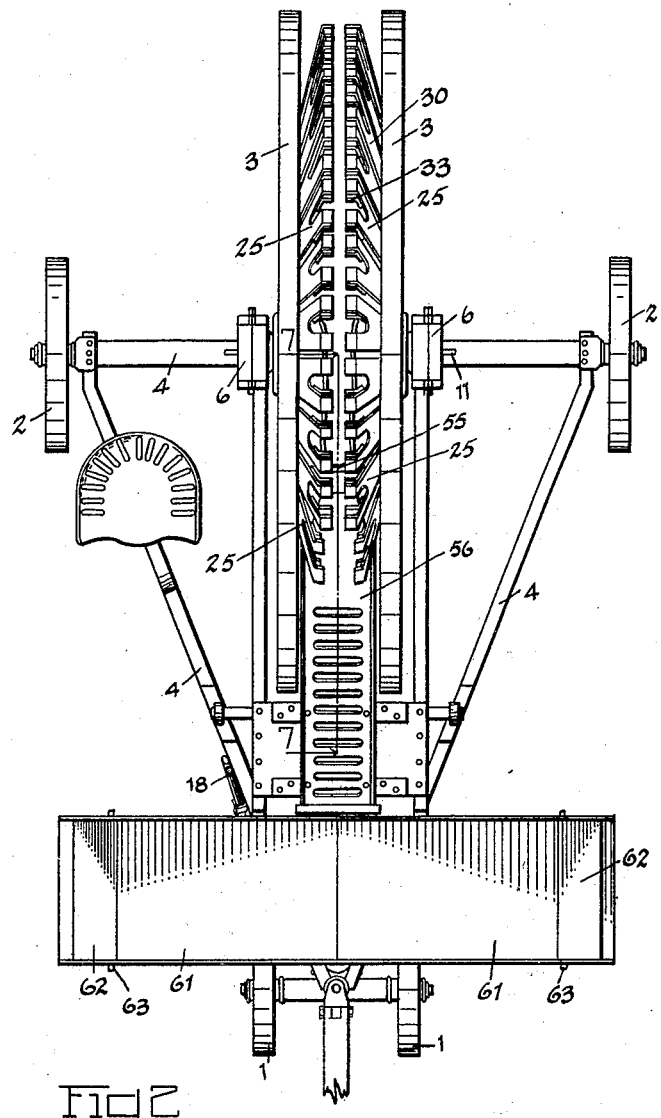
Inventor
John Bernard Verhoff
By Faust F. Crampton
Attorney Dec. 30, 1930.        J. B. VERHOFF        1,787,026
AGRICULTURAL IMPLEMENT
Filed Sept. 8, 1928        4 Sheets-Sheet 3
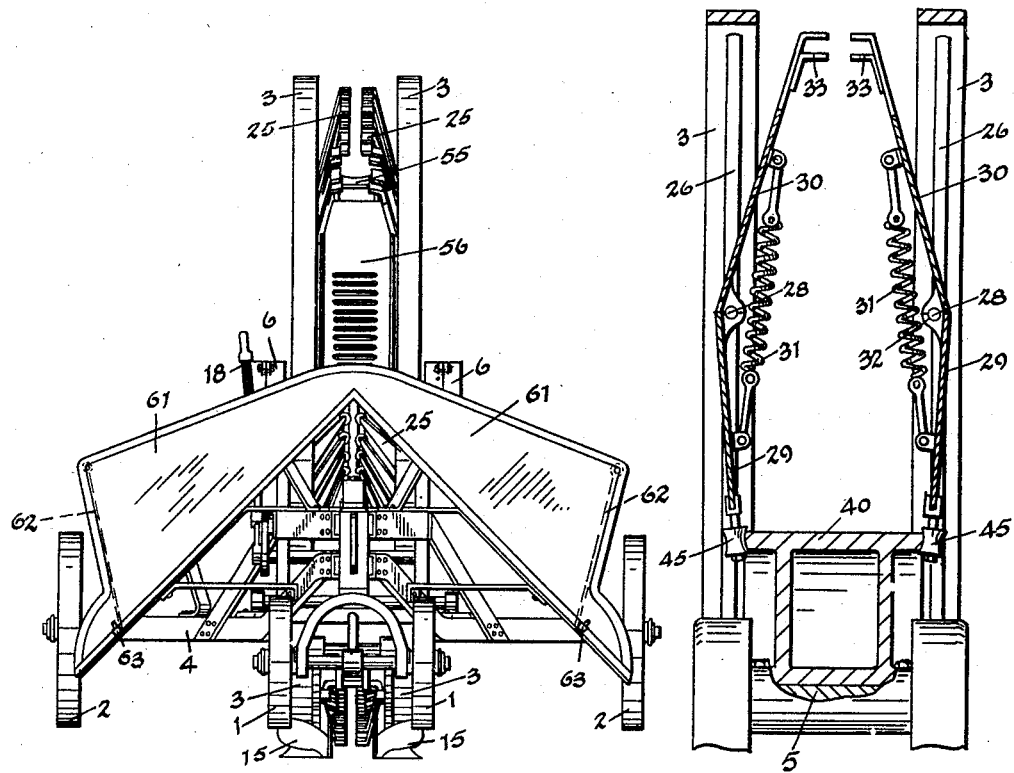
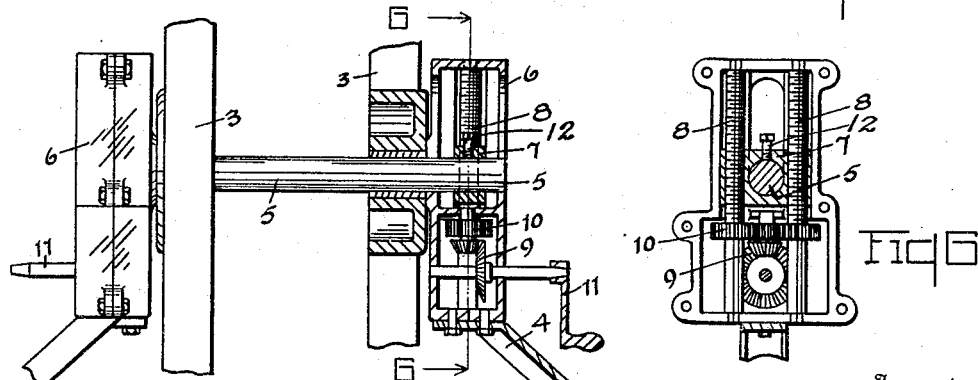
Inventor
John Bernard Verhoff
By Faust F. Crampton
Attorney

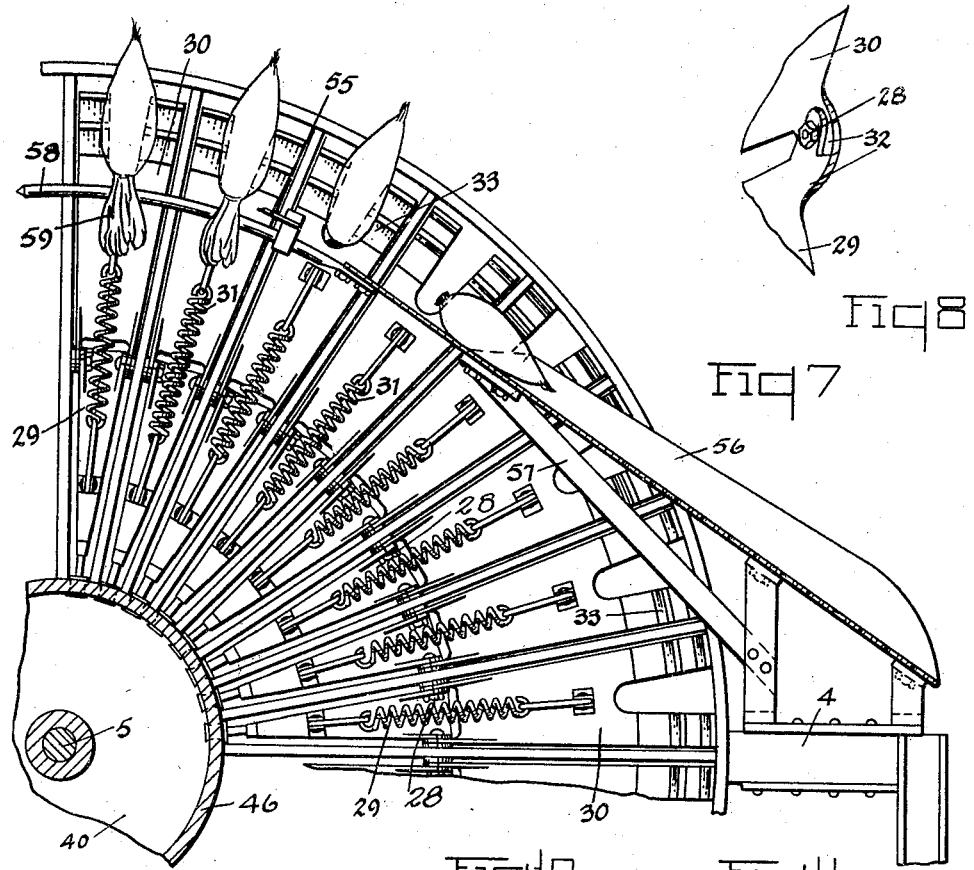

Patented Dec. 30, 1930

1,787,026

UNITED STATES PATENT OFFICE

JOHN BERNARD VERHOFF, OF LIMA, OHIO

AGRICULTURAL IMPLEMENT

Application filed September 8, 1928. Serial No. 304,643.

My invention has for its object to provide an efficient agricultural implement for harvesting beets, turnips, carrots, and other types of vegetation the body of which is grown beneath the level of the ground, whereby such vegetation may be loosened from the soil, topped and delivered at desired points along the path of movement of the machine.

In constructions embodying my invention, the tubers are grasped by members that lift them from the soil and deposit them where they may be readily gathered. Preferably, the tubers are topped and directed into a chute from which they may be liberated or withdrawn from the machine.

The invention may be contained in structures of different forms, and to illustrate a practical application of the invention, I have selected a structure containing the invention as an example of the different embodiments of my invention, and shall describe it hereinafter. The machine selected for purposes of illustration, is shown in the accompanying drawings.

Fig. 1 is a side view of the harvester. Fig. 2 is a top view of the harvester. Fig. 3 is a front view of the harvester. Fig. 4 is a view of a section taken on the plane of the line 4—4 indicated in Fig. 1. Fig. 5 illustrates a means for varying the relative position of parts of the mechanism. Fig. 6 is a view of a section taken on the plane of the line 6—6 indicated in Fig. 5. Fig. 7 is a view of a section taken on the plane of the line 7—7 indicated in Fig. 2 and is an enlarged illustration of a part of the mechanism. Fig. 8 illustrates a detail of the engaging members that operate to seize the tubers. Fig. 9 is a rear view of a cam member for actuating the engaging members illustrated in Figs. 4, 7 and 8. Fig. 10 is a top view of the cam member shown in Fig. 9. Fig. 11 is a front view of the cam shown in Figs. 9 and 10.

The form of construction shown in the drawings is particularly designed for harvesting beets. The parts of the agricultural implement are supported for conveyance on wheels 1 and 2, or on the wheels 1, 2, and 3, when in operation. The wheels 2 and 3 are so interconnected that one may be lowered relative to the other so as to locate either the wheels 2 or the wheels 2 and 3 on the ground. The wheels 1 and 2 are connected by suitable axles to the frame 4 of the machine, while the wheels 3 are rotatably supported on the fixed axle 5 that may be shifted relative to the frame 4. In the particular form shown in the drawings, the axle 5 extends through a pair of trunnions or bearings 7 located within a pair of boxes 6. The boxes 6 are so located on the frame 4 as to accommodate the ends of the shaft 5. A screw 12 is provided to pass through the top of the trunnion 7 and presses against the axle 5 to prevent rotative movement of the axle. A pair of screws 8 extend through each trunnion 7 so as to raise the trunnions when the screws 8 are rotated. Suitable mechanism may be provided for the rotation of the screws 8, such as the bevel gears 9 and the gear wheels 10. The gears and screws may be operated by means of a suitable crank 11 to raise and lower the axle or shaft 5 and to raise the wheels 3 that are rotatably supported by means of the axle or shaft 5. Thus, when it is desired to raise the wheels 3 from the surface of the ground, the cranks 11 may be rotated so as to lift the axle 5 until the wheels 2 rest on the surface of the ground. Since the wheels 3 form a part of the harvesting implement they are, preferably, raised from the ground when the implement is not in use. Thus for conveyance purposes, the wheels 2 are used to support the harvesting implement, while in operation the wheels 2 and 3 may be used for supporting the implement.

The harvester is also provided with a pair of plows 15 that are located in front of the wheels 3, the plows operating to form furrows in which the lower portions of the wheels 3 travel. The plows 15 also operate to loosen the soil about the vegetation to be harvested. The plows 15 are provided with the usual plow beams 16 that are pivotally connected to the frame 4 of the machine. The plows 15 may be lowered or raised to and from the ground by a suitable lever and link mechanism 17 that may be operated by means of the hand lever 18 which may be secured in any desired position by the usual dog and ratchet mechanism 19.

As the rims of the wheels 3 move in the furrows formed by the plows 15, the tubers, such as beets, are grasped by finger members 25 that are pivotally supported between the spokes 26 at mid-radial points. The finger members 25 extend radially with respect to the axis of rotation of the wheels 3 and are operated in pairs so that the outer ends move in pairs towards each other to penetrate the earth located between the furrows formed by the plows 15, and grasp the tubers that may be located in the ridge of earth that is thus formed by the plows 15.

The finger members 25 are jointed, the parts of the finger members being pivotally supported on the bolts 28 that extend through the metal spokes 26. The parts 29 and 30 of the finger members 25 are connected together by the springs 31 so as to draw the parts 29 and 30 angularly toward each other. The parts swing on the bolts 28 until they are limited in such movement by suitable limiting stops 32 that interengage so as to normally place the parts 29 and 30 in a definite angular relation to each other. The spring 31 permits one of the parts of each finger member to move relative to the other. The finger members being arranged in pairs and the members of each pair being located in opposed relation to each other, and the springs 31 operating to yieldingly draw the finger members inwardly with respect to the wheels 3, the outer ends of the finger members are in position to engage the tubers of different sizes in the ridge that is formed between the furrows.

Preferably, the ends of the finger members are formed in the shape of a Y, such as shown in Fig. 1, and are also made double by means of the short sheet metal bracket shaped parts 33 that are secured to the finger members 25 near their outer ends. Thus the finger members are of a form to securely seize the tubers as they are grasped in the operation of the machine.

To operate the finger members to cause them to seize the tubers and also to release the tubers, a cylindrical cam 40 is secured to the axle or shaft 5. The cam 40 has an edge portion that varies in contour according to the movements that it is desired to produce at the outer ends of the finger members 25. The distance between the edge portions of the cam 40 vary according to the distance that it is desired to normally place the outer ends of the finger members 25. When the outer ends of the finger members 25 are located on opposite sides of the ridge formed between the furrows, produced by the plows 15, the inner ends of the fingers 25 are caused to pass to the wider part of the cam, such as at 41, so as to bring the outer ends of the finger members toward each other and cause them to penetrate the ridge formed between the furrows and grasp the beets. Continued rotation of the wheels 3 maintains the finger members in this position as the inner ends move over the wider part of the cam. When the finger members grasp the beets, they are spring pressed by the springs 31 against opposite sides of the beet and thus the beet is elastically held by the finger members. Thus different sizes of beets may be grasped and carried upward and over the top of the wheels 3 as the wheels continue to rotate and move over the surface of the ground.

As the inner ends of the fingers continue to move over the wider portion 43 of the cam 40, the beets are held grasped by the finger members until the inner ends of the finger members move to the narrower portion 44 of the cam, whereupon the outer ends of the finger members 25 are released from the spring tension of the springs 31. Preferably, the inner ends of the finger members 25 are provided with rollers 45 which ride upon the edge of the cam 40. Also, in order to positively separate the outer ends of the finger members, the cam 40 is provided with slots 46 into which the rollers 45 move and thus the rollers 45 are forced toward each other so as to positively tilt the finger members so that their outer ends move outward to release the beets.

During a part of the travel of the beets and while they are held by the outer ends of the fingers 25 and moved by the rotation of the wheels 3, their tops may be severed by a suitable knife 55 located in the path of movement of the tops of the beets. Thus the knife 55 may be secured to a suitable frame 57. If desired, suitable rods 58, arranged V-shaped, may be secured to the end of the frame 57 for gathering the tops 59 as they approach the knife 55 and thus insure their severance from the beets.

In order to collect the beets, a chute 56 is so disposed that its upper end is located at the point in the rotation of the wheels 3 at which the outer ends of the finger members 25 are separated, which causes the finger members 25 to clear the upper end of the chute 56 as the beets are released by the finger members and, consequently, the beets are caught by the chute 56 and guided down to a double hopper-shaped trough 61. The hopper 61 may be provided with gates 62 that may be held closed by suitable latches 63. The latches may be opened at desired points in the travel of the machine to deliver the beets that may be collected in the hopper 61.

I claim:

1. In a harvester for beets and the like, a pair of connected wheels, a plurality of pairs of radially extending finger members pivotally supported on the wheels at mid-radial points, each of the said finger members formed of two parts, a spring for connecting the parts of each finger member, the said parts having stops for limiting the pivotal movements of the said parts relative to each other by the pressure of the spring, a cylindrical member surrounding the axis of the wheels and having a cam edge for operating on the inner ends of the fingers to separate and bring together the outer ends of the fingers to grasp the beets by the tension of the springs.

2. In a harvester for beets and the like, a pair of connected wheels, means for lowering the wheels to lower the lower portions of the wheels from above the level of the ground to below the level of the ground, a plurality of pairs of radially extending finger members pivotally supported on the wheels at mid-radial points, each of the said fingers formed of two parts, a spring for connecting the parts of each finger member, the said parts having stops for limiting the pivotal movements of the said parts relative to each other by the pressure of the spring, a cylindrical member surrounding the axis of the wheels and having a cam edge for operating on the inner ends of the fingers to separate and bring together the outer ends of the fingers to grasp the beets by the tension of the springs, and to release the beets after they have been carried to the top of the wheels, a chute for receiving the beets from the top of the wheels and directing the beets to the opposite sides of the harvester.

3. In a harvester for beets and the like, a pair of connected wheels, means for lowering the lower portions of the wheels below the level of the ground, a plurality of pairs of radially extending finger members pivotally supported on the wheels at mid-radial points, each of said fingers formed of two parts, a spring for connecting the parts of each finger member, the said parts having stops for limiting the pivotal movements of the said parts relative to each other by the pressure of the spring, a cylindrical member surrounding the axis of the wheels and having a cam edge for operating on the inner ends of the fingers to separate and bring together the outer ends of the fingers to grasp the beets by the tension of the springs and release the beets when they have been carried to the tops of the wheels, a beet top cutter located in the path of the movement of the tops of the beets and above the axis of the wheels for severing the beet tops in advance of the releasement of the beets.

In witness whereof I have hereunto signed my name to this specification.

JOHN BERNARD VERHOFF.